Sept. 29, 1959

J. F. COSTA 2,906,998

SIGNALING SYSTEM

Filed Aug. 19, 1955

5 Sheets-Sheet 1

INVENTOR
J. F. COSTA
BY
ATTORNEY

Sept. 29, 1959 J. F. COSTA 2,906,998

SIGNALING SYSTEM

Filed Aug. 19, 1955 5 Sheets-Sheet 2

INVENTOR
J. F. COSTA
BY [signature]
ATTORNEY

Sept. 29, 1959 J. F. COSTA 2,906,998

SIGNALING SYSTEM

Filed Aug. 19, 1955 5 Sheets-Sheet 3

INVENTOR
J. F. COSTA
BY [signature]
ATTORNEY

Sept. 29, 1959

J. F. COSTA 2,906,998

SIGNALING SYSTEM

Filed Aug. 19, 1955

5 Sheets-Sheet 4

INVENTOR
J. F. COSTA
BY
ATTORNEY

INVENTOR
J. F. COSTA
BY [signature]
ATTORNEY

United States Patent Office 2,906,998

Patented Sept. 29, 1959

2,906,998

SIGNALING SYSTEM

Joseph F. Costa, Emerson, N.J., assignor to Bell Telephone Laboratories, Incorporated, New York, N.Y., a corporation of New York Application August 19, 1955, Serial No. 529,382

2 Claims. (Cl. 340—152)

This invention relates to revertive control signaling systems, and in particular to a signaling system comprising a sending station and receiving station connected by a trunk over which signals symbolizing information requested by the receiving station are transmitted to the sending station, and signals symbolizing the information requested are transmitted from the sending station to the receiving station.

One object of the invention is a signaling system in which the receiving station may be arranged for selective acceptance of one of a plurality of signals transmitted by the sending station, each signal symbolizing a particular item of information, and in which, in response to a signal from the receiving station acknowledging acceptance of the signal for which said receiving station is adjusted, the sending station transmits signals indicated by the accepted signal.

Another object of the invention is an arrangement by which the "question" signals are transmitted in a sequence from the sending station, and further transmission of such signals is prevented on the acceptance by the receiving station of the signal for which it is adjusted, consequent to which the sending station automatically transmits the signal indication earmarked by the acknowledged signal.

Still another object of the invention is the provision of means whereby if, during the transmission of the substantive signals, the receiving station is readjusted to accept a different group of substantive signals, the sending station will automatically transmit the different group of signals.

Still another object of the invention is the provision of suitable alarms at both the sending and receiving stations to indicate failure of the receiving station to respond to any of the transmitted question signals and to the associated substantive signals.

Figures 1, 6:
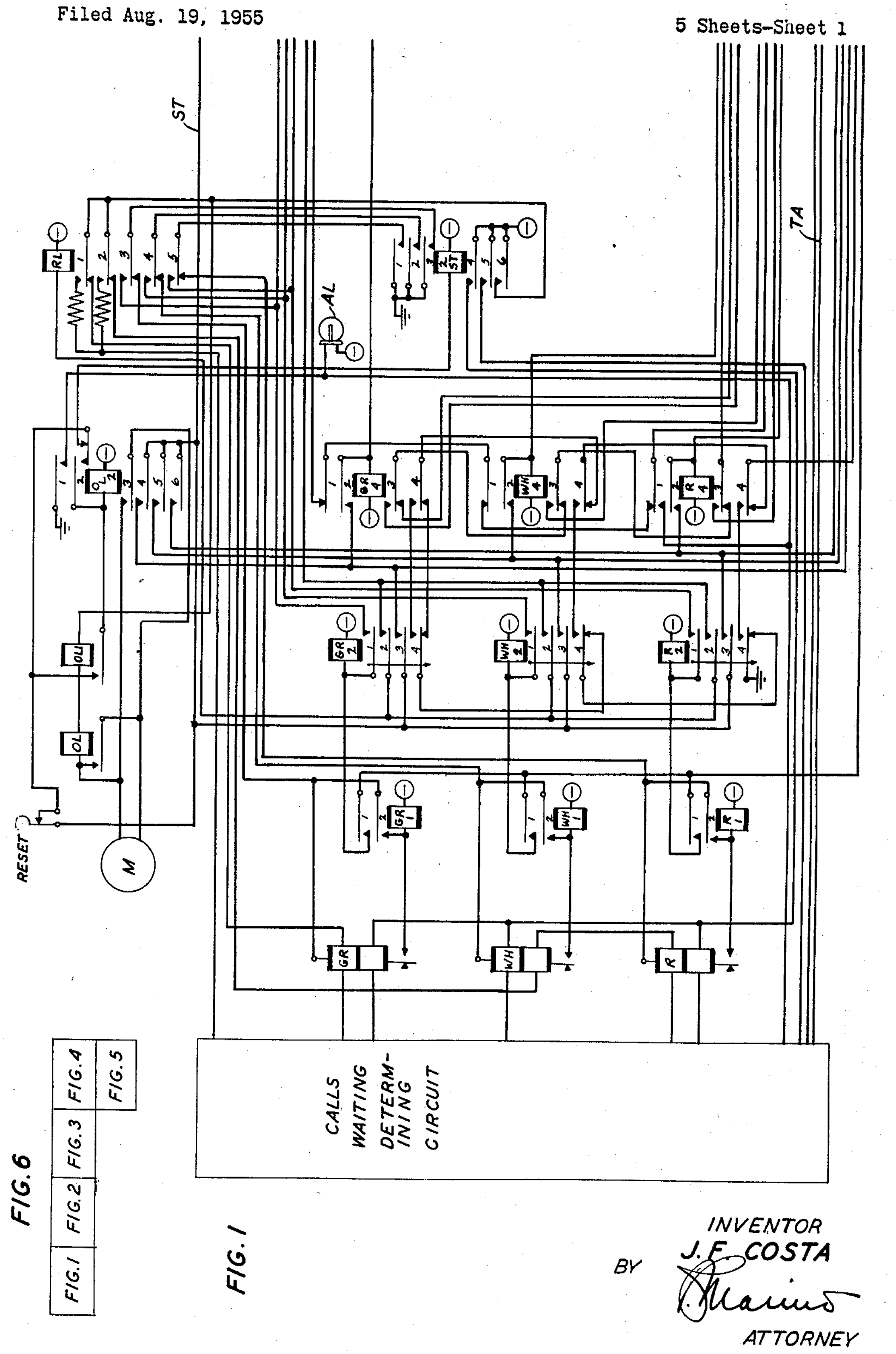
Figure 2:
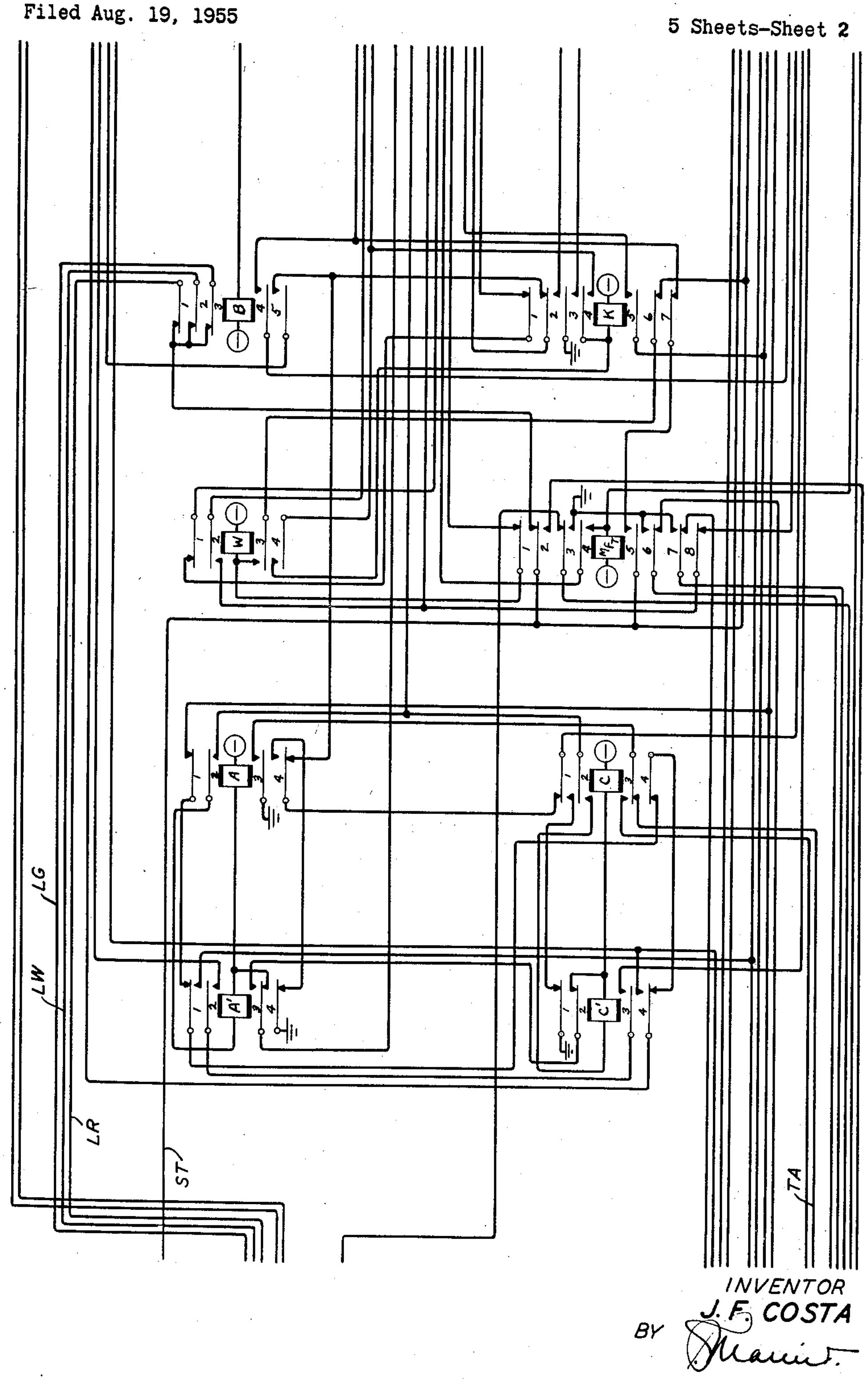
Figure 3:
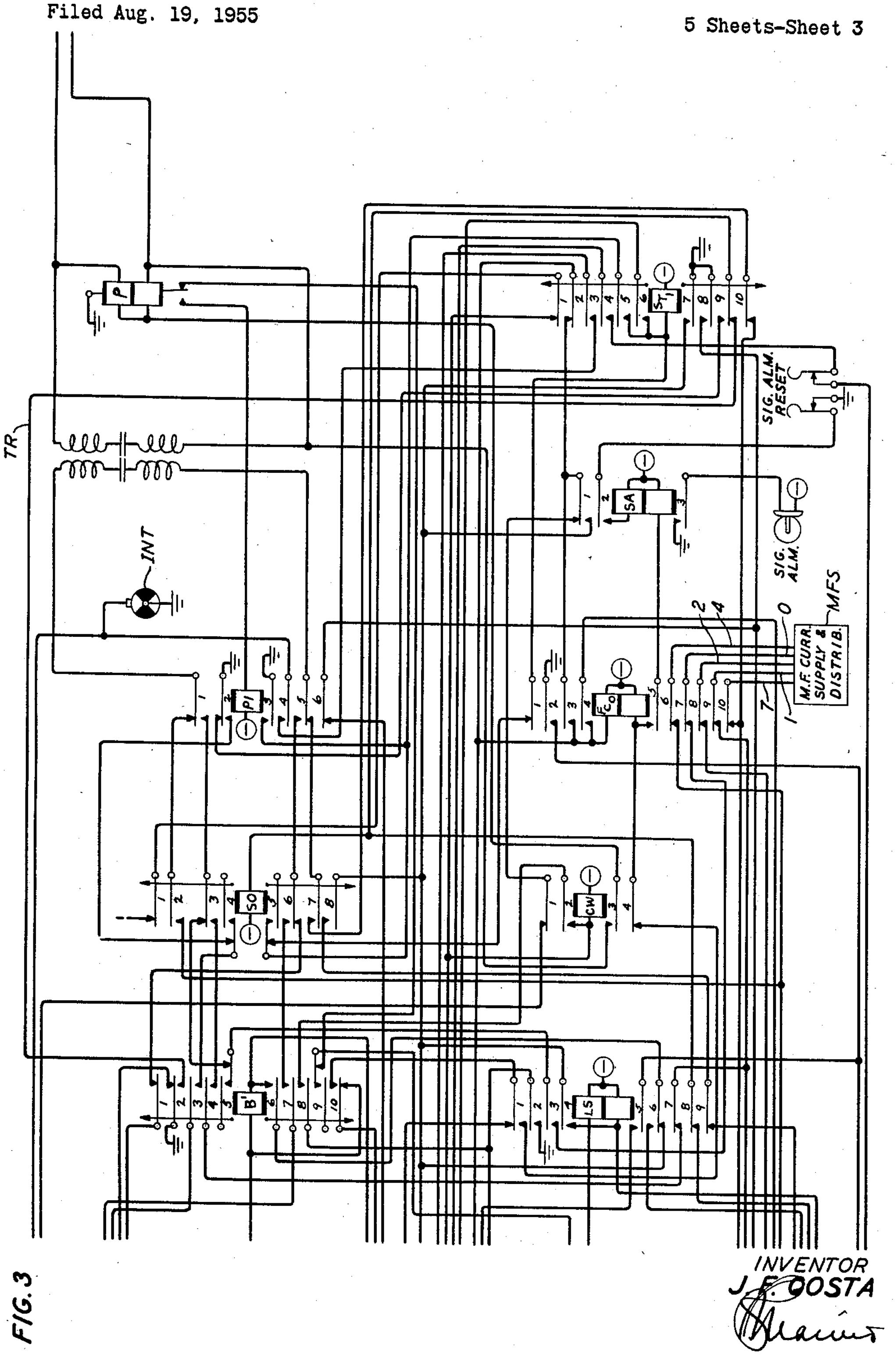

These and other objects of the invention will be the more readily understood from the following detailed description, appended claims and attached drawings in which:

Figs. 1, 2 and 3 show the circuits of the sending station, connected at one end in Fig. 1 to a calls waiting determining circuit shown in detail in Patent No. 2,848,543 issued to R. N. Breed et al. on August 19, 1958 and herein included by reference, and connected at the other end in Fig. 3 to a trunk outgoing to the receiving station. Fig. 3 also shows in block form any suitable source of multi-frequency currents.

Figure 4:
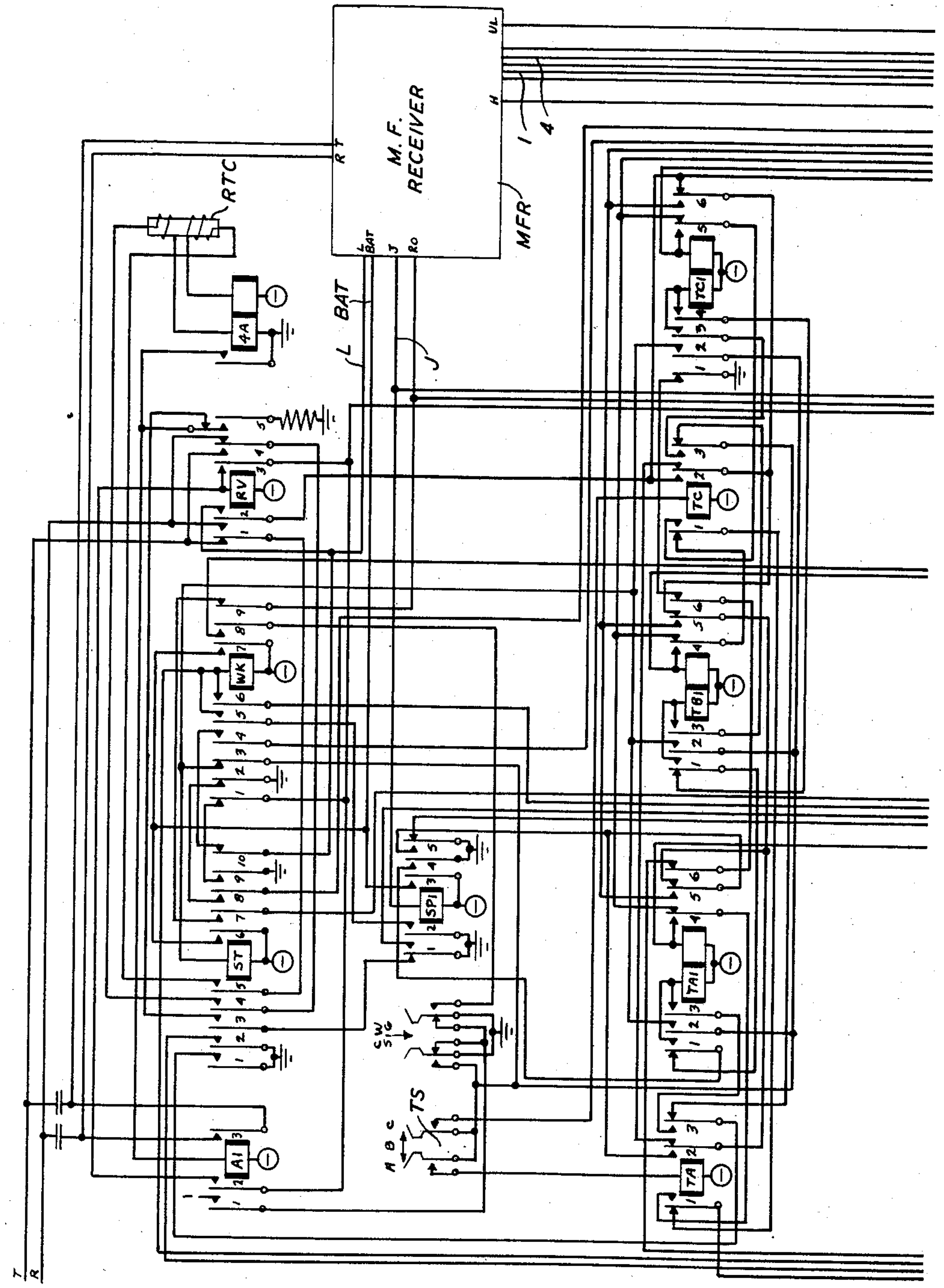
Figure 5:
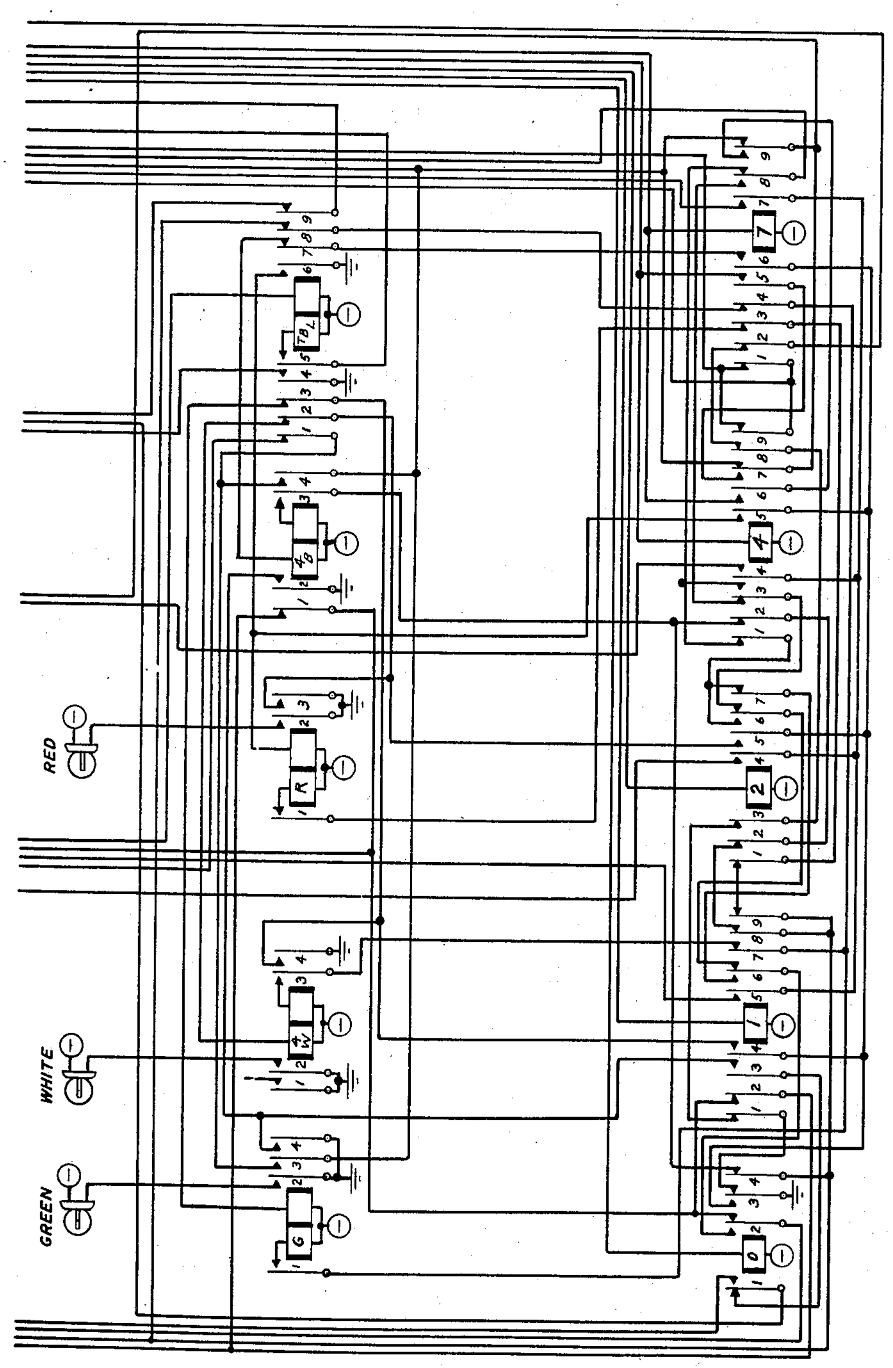

Figs. 4 and 5 show the circuits of the receiving station at which the trunk terminates, including in block form a multifrequency receiver of the kind shown in Patent No. 2,332,912, issued to G. Hecht et al. on October 26, 1943, and herein included by reference; and Fig. 6 shows the manner in which Figs. 1 to 5, inclusive, should be arranged to completely disclose the invention.

In the concrete embodiment of the invention herein described by way of example, said invention is applied to a telephone exchange system of the kind shown and described in the above-mentioned patent to R. N. Breed et al. In this telephone system, the tandem exchange is provided with facilities for recording items of record information for chargeable calls established through said tandem exchange between subscribers in local exchanges. The record thus produced is subsequently processed in an automatic message accounting center by a number of automatic message accounting machines, which produce a printed record of the number of message units chargeable to each subscriber over a given period for each "bulk-billed" call, and also a printed record for each toll call of the conversation time therefor. These records are then utilized by the business office of the telephone company to produce the monthly bills for the subscribers.

Now while in the telephone system above briefly indicated a calling subscriber dials the wanted subscriber's telephone directory number, it is necessary for the calling subscriber to supply the operating company with his own directory number. For this purpose, the tandem exchange is arranged with facilities by which, after the calling subscriber has dialed the wanted number into a register sender connected to the extension of the line to the tandem exchange, an operator is brought in on the connection to ask the subscriber for his number, after which said number is keyed into the sender by the operator, the sender then proceeding to control facilities by which the connection is extended to the called subscriber, and to control other facilities by which certain details pertaining to the billing of the connection are recorded. The association of the operator with the subscriber is accomplished by way of the sender through linking equipment between it, the line, and the operator's position. The time taken by the operator to obtain the number from the subscriber and to key it into the sender is, of course, relatively short, which fact enables one operator to serve a large number of calls, and but a few operators to serve a large number of senders.

Since the number of operators manning the switchboard at the tandem exchange varies during the day in accordance with traffic, it is important for traffic supervision to have at all times some idea of the relation between the number of operators on duty and the number of calls waiting for service; that is, waiting to give their respective numbers before their connections can be extended to their given destinations. From such information the traffic people know whether the number of operators manning the switchboard is less than or equal to the number required, and to take appropriate action in respect thereto.

In Figs. 49 and 50 of said Breed et al. patent is shown a calls waiting determining circuit which is adapted to furnish an indication of the number of calls waiting per position occupied. The determining portion of the circuit is indicated as a rectangle at the left of Fig. 1 in the drawing of the present application, but the three relays GR (green) WH (white) and R (red) of said circuit, which operate in response to the operation thereof to furnish the desired signals, are shown in said figure.

In brief, the calls waiting determining circuit is designed to furnish three signals, each giving a predetermined indication of the number of calls waiting at each occupied operator's position, the three signals being indicated by the three relays G, WH and R outside of the box. These signals, which may be described as green, white and red, have different significances according to a certain "team size" relation between the total number of positions making up the switchboard and the number of such positions occupied by the operators to give service.

The calls waiting determining circuit is designed to function in accordance with three team size indications, namely, team sizes A, B and C. Team size "A" is used in periods of very light loads when the switchboard is manned by less than five operators. Under this condition the green signal is normally given if the number of calls waiting is 1.0 per position, the green and white signals are given if the number of calls waiting per position is 2.0, and the white, green and red signals are given when the number of calls waiting is 3.0 per position. The lighting of the red lamp by itself is used as an indication of trouble.

Team size "B" is used during periods of traffic load greater than that for which team size "A" is used, but still not heavy, and usually for the condition when the switchboard is manned by from 5 to 10 operators. In this case the green signal is normally given if the number of calls waiting per position is 0.50, the white and green signals if the number is 1.00, and the white, green and red signals if the number is 1.50.

Team size "C" is used during periods of heavy load when the switchboard is manned up to full capacity. In this case the green signal is given if the number of calls waiting per position is 0.25, the white and green if the number is 0.70, and white, green and red if the number is 1.00.

However, the calls waiting determining circuit is provided with adjustable means so that the ratio between the number of calls waiting and the team size which produces a particular signal may be varied as desired, the foregoing ratios being merely typical. For example, the calls waiting determining circuit may be set to give the green signal for team size A for any ratios between 0.50 and 2.0.

In the disclosure of said R. N. Breed et al. patent the switchboard is located at the tandem office. There are cases, however, in which no space for a switchboard is available at such office, when it is necessary to place the switchboard in a remote office and cause the operators thereat to service the senders at the tandem office over trunks that enable the operators to converse with calling subscribers and transmit digital signals of the given directory numbers into the waiting senders. Also in such cases, it is necessary to provide the various team size signals at the remote switchboard where, in response in the signals, adjustment of operator load to waiting calls may be made by occupying or vacating positions as the case may be.

The specific embodiment of the present invention concerns the transmission of such signals under the control of the remote switchboard, or "receiving" station, the tandem exchange at which the signals originate being here understood to be the "sending" station; such signals being received and registered at the receiving station for the use of the traffic people. For this purpose the two stations are connected by a trunk over which signals are transmitted both ways. Also for this purpose, the different signals indicating each of the three team sizes A, B and C are each constituted of the two frequencies given below, which are transmitted from the sending station. Each of these groups of frequencies is examined at the receiving station and checked in the manner to be described for the particular team size for which the receiving station is adjusted:

*Team size signals*

| Team Size | Frequencies | Code Designation of the Frequencies |
|---|---|---|
| A | 900 and 1,100 | 1, 2 |
| B | 900 and 1,300 | 1, 4 |
| C | 900 and 1,500 | 1, 7 |

A group of two frequencies is also assigned to each of the lamp signals, as follows:

*Lamp signals*

| Lamp | Frequencies | Code Designation |
|---|---|---|
| Green | 700, 900 | 0, 1 |
| White | 700, 1,100 | 0, 2 |
| Red | 700, 1,300 | 0, 4 |
| Black (no lamps) | 700, 1,500 | 0, 7 |

All of the above frequencies are generated by any suitable source such as the one designated MFS, and each frequency is given a code, as above indicated, which is identical to that of the conductor over which the frequency is applied to the circuit of the sending station and to the relay in the receiving station which is operated by a multifrequency receiver operating in response to said frequency.

The operation of the sending station, shown in Figs. 1, 2 and 3, is under the control of key CWSIG and the team size key TS, both at the receiving station, shown in Figs. 4 and 5. When key CWSIG is operated and key TS is operated to one of its three positions: A for team size "A," B for team size "B" and C for team size "C," a signal is transmitted to the sending station to the effect that the receiving station has been placed in a condition to receive the signals pertaining to one of the three team sizes. In response to this signal the sending station operates to transmit in succession the three team size frequency signals B, A and C, in the order thus given. These frequencies are received in the multifrequency receiver MFR, but as soon as the frequencies received are those of the team size for which the receiving station is adjusted, said station transmits a signal to this effect to the sending station, which then arrests the sending of further team size frequencies and transmits the lamp signal corresponding to the wanted team size. This lamp signal, when received by the receiving station, results in the lighting of the green, white and red lamps as appropriate. This lamp signal is continuously transmitted so long as the two keys CWSIG and TS remain undisturbed: the signal may be changed by changing the position of the team size key TS, or it can be stopped by releasing the key CWSIG, the latter being effective in restoring both the sending and receiving stations to normal.

Having described the general features of the invention, the description of its detailed operation follows.

With the team size key TS at the receiving station set to the desired team size position, the call waiting signal key CWSIG is operated. If key TS is operated to position A, a circuit is completed for relay TA from ground on the left front contacts of key CWSIG, left contacts of key TS, winding of relay TA, to battery, causing said relay to operate. If the key TS is operated for team size position "B" (that is, the key remains normal), nothing happens at the receiving station, or control switchboard. On the other hand, if the key TS is operated for team size "C," a circuit is completed for relay TC from ground through the left front contacts of key CWSIG, right contacts of key TS, winding of relay TC, to battery, causing the latter relay to operate.

In the meanwhile, the operation of key CWSIG also completes the circuit of relay ST over the No. 3 contacts of relay WK, winding of relay ST, to battery, causing said relay to operate. Over its No. 6 contacts, said relay applies battery to lead BAT extending into the multifrequency receiver MFR, thereby, in combination with ground supplied thereto from the No. 3 back contacts of relay 0, No. 1 contacts of relay 1, No. 3 contacts of relay 2, No. 8 contacts of relay 4, No. 2 contacts of relay 7, lead UL, unlocks said receiver in the known manner to make it responsive to multifrequency signals. Over its No. 3 contacts, relay ST completes a circuit path for relay A1, extending from battery through the winding of said relay, normally made No. 5 contacts of relay RV, No. 3 contacts of relay ST, No. 1 back contacts of relay SP1, to ground. Relay A1 operates and completes a circuit for the trunk reversing relay RV from battery through the winding of said relay, No. 2 contacts of relay A1, No. 1 contacts of relay WK, No. 9 contacts of relay ST, to ground, operating said relay RV to reverse the battery and ground connections to the trunk T and R conductors through relay 4A, as will shortly appear. At the same time, relay A1, over its No. 3 contacts, short-circuits conductors T and R extending into the receiver MFR to protect the latter from transients that may be caused at the trunk reversing contacts of relay RV upon the operation of said relay. Relay A1 releases upon the operation of relay RV, the latter having locked over its No. 3 contacts, No. 1 contacts of relay WK, to ground on the No. 9 contacts of relay ST.

With relay RV operated, relay ST, over its No. 5 contacts, closes a path from battery through the right winding of relay 4A, lower winding of retard coil RTC, said No. 5 contacts of relay ST, No. 1 front contacts of relay RV, to conductor R of the trunk; while the No. 4 contacts of relay ST close a path from ground through the left winding of relay 4A, upper winding of retard coil RTC, said No. 4 contacts, No. 4 front contacts of relay RV, to conductor T of the trunk. This path is closed into a circuit through both windings of polarized relay P at the tandem end of the trunk. However, due to the high resistance of the lower winding of said relay, the quantity of current flowing through the circuit is sufficient to cause the operation of relay P but not that of relay 4A.

With relay P operated, relay P1 is operated over an obvious circuit, in turn, completing the circuit of slow release relay ST1 from ground on the No. 3 contacts of relay P1, normally made No. 5 contacts of relay S0, No. 1 contacts of relay FC0, winding of relay ST1, to battery. The latter relay operates, locks over its top No. 5 contacts to operating ground independently of relays FC0 and S0, completes a circuit for relay W over locking ground extended through the No. 6 contacts of relay ST1, No. 1 contacts of relay MFT, winding of relay W, to battery. Relay W operates, locks over its No. 3 contacts, No. 6 contacts of relay K, to ground on the No. 8 contacts of relay ST1 and, among other functions, completes a circuit for relay B from ground on interrupter INT when engaging its conducting segment, No. 4 contacts of relay P1, No. 3 contacts of relay ST1, No. 2 contacts of relay W, No. 10 back contacts of relay B′, winding of relay B, to battery, operating said relay B to perform certain functions to be noted hereinafter. Relay ST1 also applies ground on its No. 8 contacts over the normally made reset key Reset (Fig. 1), No. 2 normally made contacts of relay OL2, winding of relay 2ST to battery. This relay operates. Over its No. 4 contacts it applies battery severally through the windings of relays R, WH and GR, completing the circuits of these relays in the calls waiting determining circuit as called for by the latter circuit in respect to the number of calls waiting per position occupied; over its No. 5 contacts it supplies battery to the calls waiting determining circuit for control purposes, and over its No. 6 contacts it applies battery to one side of a meter M in series with relays OL and OL1. Over its No. 1 contacts it applies ground through the No. 5 back contacts of relay RL to the armature of relay R and the locking contact of relay R1, similarly supplying ground over its Nos. 2 and 3 contacts to the armature of relay WH, the locking contact of relay WH1, the armature of relay GR, and the locking contacts of relay GR1, respectively. Depending on the condition of the calls waiting circuit, relays GR, WH, and R will operate in accordance with the pattern of the number of calls waiting per position occupied; relay GR operating relay GR1 which locks, as will relays WH1 and R1 if relays WH and R operate, respectively. If none of the relays GR, WH and R operates, it signifies a "black" lamp signal, indicating that the number of calls waiting per position is less than above indicated.

With the tandem (sending) and switchboard (receiving) ends of the trunk thus set, the tandem end transmits to the switchboard end the three team size signals previously given to determine for which one of the three the switchboard is adjusted.

The team size signals A, B and C are transmitted from the tandem office in the order of B, A and C. Consequently when relay B operates as above described, it completes the circuit of slow release relay S0, from ground on the No. 2 back contacts of relay B′, No. 5 contacts of relay B, No. 4 back contacts of relay A, No. 1 back contacts of relay C, No. 8 back contacts of relay LS, winding of relay S0, to battery. Relay S0, in operating, applies ground to the right side of the winding of relay B′, said ground tracing from ground on the No. 7 contacts of relay ST1, No. 8 contacts of relay S0, No. 9 contacts of relay LS, No. 4 contacts of relay B, to the right side of the winding of relay B′. This relay does not operate at this time because of the conductivity of interrupter INT, the ground from which, in operating relay B, keeps relay B′ short-circuited. When the interrupter INT engages an insulating segment, the short circuit is removed and relay B′ operates in series with relay B to said ground on relay ST1, both relays locking over the No. 6 contacts of relay B1, No. 6 back contacts of relay LS, to ground on the No. 7 contacts of relay ST1. The operation of relay B′ opens the circuit of relay S0 at the No. 2 back contacts of said relay B′, relay S0 releasing after an interval. During the operated condition of said relay S0 after the operation of relay B′, frequencies 900 and 1300 (codes 1 and 4, respectively) constituting the team size "B" signal are simultaneously transmitted over the trunk to the switchboard from the frequency source MFS, lead 1, No. 9 contacts of relay FC0, No. 7 contacts of relay LS, No. 4 contacts of relay B′, No. 3 front contacts of relay S0, No. 1 front contacts of relay P1, simultaneously through the left primary windings of transformer TR, No. 5 front contact of relay P1, No. 6 front contacts of relay S0, No. 7 contacts of relay B′, No. 4 back contacts of relay C′, No. 4 contacts of relay C, No. 1 back contacts of relay A′, No. 1 contacts of relay A, No. 6 contacts of relay FC0, lead 4, to the multifrequency supplier MFS. Both frequencies 900 and 1300 are repeated through the secondary windings of said transformer TR and transmitted over the trunk conductors T and R and thence into the multifrequency receiver MFR at the receiving office, or switchboard.

In response to these two frequencies, the receiver MFR applies ground to lead J thereby completing the circuit of relay SP1, which operates to (among other things) apply ground to lead L of the receiver, the ground to said lead being traced from the No. 5 front contacts of relay SP1, No. 5 back contacts of relay TA1, No. 5 back contacts of relay TB1, No. 6 back contacts of relay TC1, No. 2 contacts of relay RV, to lead L. Ground on said lead activates the thermionic devices of the receiver, which, responding further to the two frequencies, grounds leads 1 and 4 to operate relays 1 and 4 over obvious circuits. The latter two relays, when operated, complete a circuit for relay TB1, the path of which extends from battery through its right winding, No. 4 contacts of relay 4, No. 5 contacts of relay 1, to ground on the No. 1 front contacts of relay SP1. Relay TB1 operates and locks over its left winding and No. 3 contacts, No. 3 back contacts of relay TC, No. 3 back contacts of relay TA, to ground on the No. 1 contacts of relay ST. Relay TB1 closes a holding circuit for relay ST independent of relay WK.

If the team size key TS is set for team size "B," relays TA and TC will be normal. With relay TB1 operated as above described, a circuit is then completed for relay WK, the path of which extends from battery through its winding, No. 2 back contacts of relay 0, No. 1 contacts of relay 4B, No. 1 back contacts of relay TA, No. 1 back contacts of relay TC, No. 4 front contacts of relay TB1, and thence as previously traced to ground on the No. 1 front contacts of relay SP1. Relay WK operates and then locks over the No. 5 contacts to ground on the No. 2 contacts of relay SP1. Relay WK also has another locking path over its No. 6 contacts, No. 1 contacts of relay 4B, No. 1 back contacts of relay TA, No. 1 back contacts of relay TC, No. 4 front contacts of relay TB1 and thence as previously traced to ground on the No. 1 front contacts of relay SP1. Relay WK performs a function that will be later described.

If the team size key TS is set for team size "A" or "C" at the time that the team size "B" signal is received from the tandem office, the above-described circuit for relay WK is not completed inasmuch as said circuit depends on the normal condition of relay TA which is operated if the team size key TS is set for team size "A," and on the normal condition of relay TC which is operated if the key TS is set for team size "C."

Returning, now, to the outgoing end of the trunk at the tandem office, and assuming that key TS is not set for team size "B," relay S0 releases and frequencies 1 and 4 are removed from the trunk, causing the multifrequency receiver MFR at the remote switchboard to release relays SP1, 1 and 4. Relay SP1 in turn releases relay TB1. It should be noted at this time that when the frequencies 1 and 4 representing team size "B" are transmitted from the tandem office and the team size key TS at the remote switchboard is not set for team size "B," no "acknowledgment" is sent back from the switchboard to the tandem office. In the absence of this signal, the office proceeds to transmit frequencies 900 and 1100 (1 and 2) representing team size "A."

Consequently on the next closure on the interrupter INT following the transmission of frequencies 1 and 4, and since relays B and B′ are locked as before described, a path is completed for relay A extending from ground on said interrupter INT, No. 4 contacts of relay P1, thence as previously traced to the No. 2 contacts of relay W, No. 10 front contacts of relay B′, No. 1 back contacts of relay LS, No. 3 back contacts of relay A′, winding of relay A, to battery. This relay operates and applies a short-circuiting ground over its No. 2 contacts from the No. 7 contacts of relay ST1 to the winding of relay A′, keeping said last-mentioned relay short-circuited for as long as the interrupter INT maintains ground to the winding of relay A. Relay A also completes the circuit of relay S0 from ground on the No. 4 contacts of relay A′, No. 4 front contacts of relay A, No. 1 back contacts of relay C, No. 8 contacts of relay LS, winding of relay S0, to battery, operating this relay. Relay A, at its No. 3 contacts and through the No. 3 back contacts of relay C, grounds lead TA extending to a relay (not shown) in the calls waiting determining circuit, causing said relay to operate and prepare said circuit in the manner described in said R. N. Breed et al. patent to produce lamp signals appropriate to team size "A" in the event that such signals are to be transmitted to the switchboard if said switchboard is set for team size "A."

When the interrupter INT opens its contacts, the short is removed from the winding of relay A′, causing it to operate in series with relay A, both relays A and A′ locking over the No. 2 contacts of relay A to ground on the No. 7 contact of relay ST1. With the operation of relay A′, the circuit of relay S0 is opened, causing this relay to release slowly. During the time it remains operated following the opening of its circuit, the team size signal A, consisting of the frequencies 900 and 1100 (codes 1 and 2), are transmitted simultaneously over the trunk to the switchboard; the path of said two frequencies being from the supply source MFS, lead 1, No. 9 contacts of relay FC0, No. 7 contacts of relay LS, No. 4 contacts of relay B′, No. 3 contacts of relay S0, No. 1 front contacts of relay P1, primary windings of transformer TR, No. 5 front contacts of relay P1, No. 6 front contacts of relay S0, No. 7 contacts of relay B′, No. 4 back contacts of relay C′, No. 4 contacts of relay C, No. 1 front contacts of relay A′, No. 8 contacts of relay FC0, lead 2, to the supply source MFS. The two frequencies are repeated over the trunk and into the receiver MFR at the switchboard as previously described for frequencies 1 and 4 and with similar effects; that is, by the operation of relay SP1, but with the operation this time of relays 1 and 2 instead of relays 1 and 4. If the team size key TS is not set for team size A, but is set for team size C (said key not being set for team size B since, if it was, the team size signal A would not have been transmitted, as previously described) relay TC will be operated, as will relay TA1, the latter relay operating over a path from battery through its right winding, No. 4 contacts of relay 2, No. 5 contacts of relay 1, to ground on the No. 1 front contacts of relay SP1, and locking over its left winding, No. 1 front contacts, to ground on the No. 4 contacts of relay SP1. Relay TA1 also closes a holding circuit for relay ST independent of relay WK.

As before, no circuit is available for relay WK, and when the transmission of the two frequencies is terminated on the release of relay S0 at the sending office, relay SP1 releases, releasing relay TA1 and removing ground from lead L to the receiver MFR, in response to which the receiver releases relays 1 and 2.

On the reclosure of the interrupter INT, a circuit is completed for relay C, said circuit extending from ground on interrupter INT as previously traced to the No. 1 back contacts of relay LS, and then over the No. 3 front contacts of relay A′, No. 2 back contacts of relay C′, winding of relay C, to battery. Relay C operates, applying over its No. 2 contacts ground on the No. 7 contacts of relay ST1 to the left side of the winding of relay C′ to keep said relay short-circuited for as long as the interrupter contacts are closed, and completes a circuit for relay S0 from ground on the No. 1 contacts of relay C′, No. 1 front contacts of relay C, and thence as previously traced to the winding of relay S0. On the removal of ground by interrupter INT when the contacts thereof open, relay C′ operates in series with relay C, both locking over the No. 2 contacts of relay C to aforetraced ground on the No. 7 contacts of relay ST1. The operation of relay C′ opens the circuit of relay S0 which, during the operated condition following the opening of its circuit, completes the circuit of the team size C signal of 900 and 1500 cycles (code designations 1 and 7) to the trunk, said circuit tracing from the supply source MFS, lead 1 as previously traced to the No. 7 contacts of relay B′, thence to the No. 4 front contacts of relay C′, No. 3 back contacts of relays R4, WH4 and GR4, No. 10 contacts of relay FC0, to the supply source MFS. The two frequencies are transmitted over the trunk and into the receiver MFS, which operates as before to complete the circuit of relay SP1 and subsequently the circuits of relays 1 and 7, which operate.

If the team size key TS is operated to team size C position, as it would have to be if, as assumed, it is not operated to either the team size B or the team size A position, then relay TC will be operated as previously described and ground is applied to lead L of the receiver to activate its electron devices, ground to said lead L being applied over the No. 2 contacts of relay RV, No. 2 front contacts of relay TC, No. 5 back contacts of relay TB1, No. 5 back contacts of relay TA1, to ground on the No. 5 front contacts of relay SP1. If the correspondence had been with team size B, neither relay TA nor TC would have been operated, and the ground on lead L would have been applied over the No. 6 back contacts of relay TC1, No. 5 back contacts of relay TB1, No. 5 back contacts of relay TA1, to ground on the No. 5 contacts of relay SP1. Had the correspondence been for team size A, then relay TA would have been operated from the contacts of the team size key TS, whereupon ground on lead L would have been maintained over the No. 2 contacts of relay RV, No. 6 back contacts of relay TC1, No. 5 back contacts of relay TB1, No. 2 front contacts of relay TA, to ground on the No. 5 front contacts of relay SP1.

When relays 1 and 7 are operated by the receiver MFS in consequence of the latter receiving the frequencies 1 and 7 for team size C, a circuit is completed for relay TC1 from battery through its right winding, No. 7 contacts of relay 7, No. 5 contacts of relay 1, to ground on the No. 1 front contacts of relay SP1. Relay TC1 locks over its left winding and No. 4 contacts, No. 1 back contacts of relay TB1, No. 1 back contacts of relay TA1, to ground on the No. 4 contacts of relay SP1 and closes a holding circuit for relay ST independent of relay WK. Since there is, in this case, correspondence between the team size signal transmitted and the position of the team size key TS (team size position C), a circuit is completed for relay WK, the path of which may be traced from battery through its winding, No. 2 back contacts of relay 0, No. 1 contacts of relay 4B, No. 1 back contacts of relay TA, No. 1 front contacts of relay TC, No. 5 front contacts of relay TC1, No. 7 contacts of relay 7, No. 5 contacts of relay 1, to ground on the No. 1 front contacts of relay SP1. Relay WK operates, locking over its No. 5 contacts to ground on the No. 2 contacts of relay SP1, a supplementary locking circuit being also provided through its original operating circuit over its No. 6 contacts and the No. 1 contacts of relay 4B.

Relay WK operated, releases relay RV which opens lead L to the receiver MFR, releasing a relay therein which removes anode battery from the channel tubes, in turn causing the release of the receiver channel relays and of the correspondingly numbered relays in the present circuit, in this case relays 1 and 7. Relay RV, in its released condition, also changes the polarity of the trunk conductors T and R to cause the release of the polarized relay P at the tandem office as a signal that the correct team size signal was received at the switchboard.

At this point it should be stated that the operation of relay WK takes place only when the position of the team size key TS corresponds with the received team size signal. Thus if the team size key TS is set for team size position B, and the team size signal B, consisting of frequencies 900 and 1300, is received, relays SP1 and relays 1 and 4 will operate as already described, the latter two relays completing the circuit of relay TB1 and maintaining ground on lead L. Under these conditions a circuit is completed for relay WK, the path of which, in this case, may be traced from battery through its winding, No. 2 back contacts of relay 0, No. 1 contacts of relay 4B, No. 1 back contacts of relay TA, No. 1 back contacts of relay TC, No. 4 front contacts of relay TB1, No. 4 contacts of relay 4, No. 5 contacts of relay 1, to ground on the No. 1 front contacts of relay SP1. Relay WK operates, locks to ground on the contacts of relay SP1, and releases relay RV to cause the release of relay P at the tandem office, all as previously described.

If the team size key TS is positioned to team size A, and the signal received from the tandem office is for the team size A, said signal consisting of frequencies 900 and 100 (code symbols 1 and 2), relay TA is operated from the key, relays SP1 and relays 1 and 2 are operated by the receiver MFR in response to the two frequencies, and relay TA1 is operated over a previously traced circuit completed over front contacts of relays 1 and 2. A circuit is then completed for relay WK, extending from battery through its winding, No. 2 back contacts of relay 0, No. 1 contacts of relay 4B, No. 1 front contacts of relay TA, No. 4 front contacts of relay TA1, No. 4 contacts of relay 2, No. 5 contacts of relay 1, to ground on the No. 1 front contacts of relay SP1. Relay WK operates, locks, opens the circuit of relay RV to reverse trunk polarity and thereby cause the release of relay P at the tandem office, and removes ground from lead L, thereby causing the receiver to release relays SP1, 1 and 2. Thus in every case in which the team size signal transmitted from the tandem office to the switchboard agrees with the team size setting of the key TS at said switchboard, relay WK operates and relay P releases, the latter constituting an acknowledgment signal to the tandem office of such an agreement. As will be shown, circuit operations are then initiated at such office to transmit the lamp signals indicated by the team size which the switchboard is prepared to accept.

If none of the team size signals transmitted from the office brings an acknowledging response from the switchboard, relay LS operates at the termination of the transmission of team size C signal; that is, after relay S0 has released, said relay LS operating over a circuit path that may be traced from battery through its lower winding, No. 3 contacts of relay C′, No. 2 contacts of relay A′, No. 3 contacts of relay B′, No. 4 normally made contacts of relay S0, No. 2 front contacts of relay P1, to ground. Said relay LS operates, locks over its No. 4 contacts to ground on the No. 7 contacts of relay ST1, and releases relays B and B′. Under this condition, the so-called "black" lamp signal is transmitted to the remote switchboard, as will be later explained.

The release of relay P as an "acknowledgment" signal is followed by the release of relay P1, which opens the circuit of the two team size frequencies and causes the reoperation of relay S0 (should it have released in the meanwhile) over a circuit from battery through its winding, No. 9 front contacts of relay ST1, No. 2 back contacts of relay P1, to ground. Relay P1 released also completes the circuit of relay K over a path which may be traced from battery through its winding, No. 4 contacts of relay W, No. 6 contacts of relay P1, to ground on the No. 8 contacts of relay ST1, said relay K locking to operating ground over its No. 4 contacts, releasing relay W and operating relay LS over an obvious circuit through its upper winding, relay LS locking over its lower winding and No. 4 contact to ground on the No. 7 contacts of relay ST1.

The removal of the team size frequencies from the trunk following the release of relay P causes the receiver MFR at the switchboard to release relay SP1 and the two relays 1 and 7 (assuming these two relays to have been operated). The release of relay SP1 releases relay WK and, with relay RV released, causes the reoperation of relay A1 over a previously described circuit and the short-circuiting of conductors T and R towards the receiver MFR. Relay A1 then causes the reoperation of relay RV and a restoration of the polarity of the trunk in the direction that will operate relays P and P1 at the tandem office. When the latter relay reoperates, relays S0 and K release, and relay W reoperates over a path which extends from battery through its winding, No. 1 contacts of relay MFT, Nos. 6 and 5 contacts of relay ST1, to ground on the No. 3 contacts of relay P1; relay W operating and then locking as before under the control of the No. 6 contacts of relay K to ground on the No. 8 contacts of relay ST1.

When relay LS operates as before described, it opens at its No. 7 contacts the path of frequency 900 common to all three team size signals and closes that of frequency 700 (code designation 0) common to all lamp signals. Lamp signal multifrequencies are always recognized at the switchboard end as 700 cycles and some higher frequency according to a previously given table, repeated below for convenience:

| Lamp Signal | Frequencies | Channel Relays |
|---|---|---|
| Green | 700, 900 | 0, 1 |
| White | 700, 1,100 | 0, 2 |
| Red | 700, 1,300 | 0, 4 |
| Black (no lamps) | 700, 1,500 | 0, 7 |

In addition to opening the path of the 900 cycles and closing that of the 700 cycles, relay LS, on operating, opens the operating path of relays A, A′ and C, C′ and the locking path of relays B and B′, causing the latter two relays to release during the open period of interrupter INT, since during the closed period said relays are held by ground over the No. 6 front contacts of relay LS, No. 8 contacts of relay MFT, No. 3 contacts of relay ST1, No. 4 contacts of relay P1, to ground on said interrupter INT.

It will be noted that relay CW operates whenever relay K releases with relay W normal and relay LS operated, the path of its circuit tracing from battery through its winding, No. 1 contacts of relay W, No. 1 contacts of relay K, to ground on the No. 2 contacts of relay LS. Over its No. 3 contacts relay CW, when operated, short-circuits the secondary, or lower, winding of relay P. As will be shown, this increases the quantity of current flowing over the trunk from the battery supplied from the switchboard end to cause the operation of relay 4A thereat. Relay 4A performs certain functions that will be described in due course. Relay CW releases and removes this condition whenever relay W operates prior to the transmission of any multifrequency signals.

When relay LS is operated, a black lamp signal is always transmitted due to the normal condition of relays GR4, WH4 and R4.

When relays S0 and B′ are released as described after the determination of the team size acknowledged by the switchboard, a "no lamp" signal consisting of 700 and 1500 cycles (code designations 0 and 7) is closed through to the trunk. The path for the two frequencies is as follows: from the source MF, lead 0, No. 7 contacts of relay FC0, No 3 contacts of relay LS, No. 5 contacts of relay B′, No. 3 back contacts of relay S0, No. 1 front contacts of relay P1, primary windings of transformer TR, No. 5 front contacts of relay P1, No. 6 back contacts of relay S0, No. 1 contacts of relay B, serially through the No. 3 back contacts of relays R4, WH4 and GR4, No. 10 contacts of relay FC0, lead 7, supply source MFS.

These two frequencies are received at the switchboard by the multifrequency receiver MFR and result in the operation of relays 0, 7 and SP1 as previously described, relays 0 and 7 completing the path of the black lamp signal relay 4B over a circuit extending from battery through its left winding, No. 7 contacts of relay TBL, No. 6 contacts of relay 7, No. 3 front contacts of relay 0, to ground, and locking over its right winding and No. 3 contacts, No. 2 contacts of relay 4, No. 2 contacts of relay 2, No. 8 contacts of relay 1, to ground on the No. 2 contacts of relay ST. Under this condition relay WK operates over a path extending from battery through its winding, No. 2 front contacts of relay 0, No. 6 back contacts of relay 1, No. 6 contacts of relay 2, No. 3 back contacts of relay 4, No. 8 front contacts of relay 7, No. 6 front contacts of relay TC1 (locked because the switchboard is set for team size C; otherwise No. 5 front contacts of relay TB1 if set for team size B, or No. 5 front contacts of relay TA1 if set for team size A), No. 5 back contacts of relay TB1, No. 5 back contacts of relay TA1, to ground on the No. 5 front contacts of relay SP1. Relay WK operates, locks as before to ground on the No. 2 contacts of relay SP1, releases relay RV which opens lead L to the receiver MFR to release a relay in said receiver which removes plate battery from the channel tubes to release the channel relays and relays 0, 7. Relay RV released changes the polarity of the trunk conductors to release relay P at the sending end as a signal that the "black" lamp signal has been received. Released relay P releases relay P1, which operates relay S0 over a previously described path to ground on the No. 2 back contacts of relay P1, as it operates relay K, which locks over its No. 4 contacts to ground over the No. 6 contacts of relay P1 to ground on the No. 8 contacts of relay ST1. Relay W releases on the operation of relay K.

With the release of relay S0 the "black" lamp multifrequency signal is removed from the trunk, causing the multifrequency receiver MFR to release relay SP1, releasing relay WK and reoperating relay RV to restore trunk polarity for the reoperation of relay P at the sending end.

Before relay P operates, however, relay MFT operates from battery through its winding, No. 5 contacts of relay LS, No. 2 front contacts of relay K, No. 9 normally made contacts of relay B′, to ground on the back contacts of relay P. Relay MFT locks over its No. 4 contacts, No. 4 contacts of relay ST1, right contacts of reset key SIG ALM RESET, No. 4 back contacts of relays R4, WH4, GR4 in series, No. 4 back contacts of relays GR2, WH2, R2 to ground. This locking circuit, however, is present only if the lamp signal under the required team size is "black"; that is, that the calls waiting determining circuit has determined that there are less than the required number of calls waiting per position occupied, in which event relays GR, WH and R are normal, as will be relays GR1, WH1 and R1, thereby closing no circuit for operating relays GR2, WH2 and R2. Under this condition, when relay MFT operates, the normal condition of relays GR1, WH1 and R1 will keep relays GR2, WH2 and R2 normal, thereby completing the above described locking circuit. If, however, the pattern is different, for example that relays GR1 and WH1 are operated, then a circuit is completed for relay GR2 from battery through its winding, No. 1 contact of relay GR1, No. 2 front contacts of relay MFT, to ground on the No. 8 contacts of relay ST1. A similar circuit is also closed for relay WH2. Under this condition there will be no locking circuit for relay MFT, so that when its operating circuit is opened by the operation of relay P, it will release. If at the time it releases, relays GR2 and WH2 are still operated (the calls waiting determining circuit might have changed the pattern in the meanwhile), circuits will be completed for relay GR4 and WH4, the former from battery through its winding, No. 3 back contacts of relay MFT, No. 3 contacts of relay GR2, to ground on the No. 8 contacts of relay ST1. Relay WH4 operates over a circuit from battery through its winding, No. 7 back contacts of relay MFT, No. 3 contacts of relay WH2, to aforetraced ground. Relays GR4 and WH4, on operating, lock over their respective No. 2 contacts and respective No. 3 contacts of the associated relays GR2 and WH2, to aforetraced ground. As will be explained, the lamp signal transmitted after the black lamp signal following the acknowledgment of the team size setting of the team size key TS is determined by the operation of the calls waiting determining circuit. This circuit arrangement renders certain the fact that the lamp signal that will be transmitted is the one indicated as the "latest" after the operating circuit of relay MFT is opened by the reoperation of relay P. In the event that relay MFT does lock with all relays GR2–R4 normal, indicating that the calls waiting determining circuit has not changed the pattern, then no more lamp signals will be sent until said relay is released by a change in the pattern of relays GR2–R2.

While relay MFT is operated on its original circuit, and with relay K normal, relays B and B′ are operated in series over a circuit extending from battery through the winding of relay B, the winding of relay B′, No. 7 contacts of relay K, No. 5 contacts of relay MFT, lead ST, to ground on the No. 8 contacts of relay ST1. When relay MFT releases after its operating path is opened and no locking circuit is available as before described, relays B and B′ release. With relay B normal, leads LR, LG and LW are bunched over its Nos. 1, 2 and 3 contacts and the No. 2 back contacts of relay MFT to ground on the No. 8 contacts of relay ST1, thereby to cause whichever of the relays R2, WH2 and GR2 (all being slow release) are operated to remain locked over their respective No. 2 contacts; relay MFT, in its released condition, opening the operating circuit of said relays R2, WH2 and GR2 and closing the operating paths of relays GR4, WH4 and R4 which, as before described, take a setting dependent upon the setting of relays GR2, WH2 and R2.

Thus if it is supposed that relay GR2 is operated at the time relay MFT is released, a circuit path is completed for relay GR4, which path may be traced from battery through the winding of said relay GR4, No. 3 back contacts of relay MFT, No. 3 contacts of relay GR2, lead ST, to ground on the No. 8 contacts of relay ST1. If relay WH2 is operated, then a circuit is completed for relay WH4 from battery through its winding, No. 7 back contacts of relay MFT, No. 3 contacts of relay WH2, and thence as traced to ground on the No. 8 contacts of relay ST1. If relay R2 is operated, then the circuit path is completed for relay R4 from battery through its winding, No. 6 back contacts of relay MFT, No. 3 contacts of relay R2, and thence as traced to ground on the No. 8 contacts of relay ST1.

Having transmitted the black lamp signal immediately after the sending station has received an acknowledgment of the agreement between the setting of the team size key TS at the remote switchboard and the team size frequencies transmitted, the sending station transmits the lamp signal indicated by the operated condition of relays GR4–R4. If these relays are normal and relay MFT is locked, as they would be if the calls waiting determining circuit indicates that the number of calls waiting for service per position occupied is less than the number that would be indicated by the green, white and red lamp signals, then no lamp signals are transmitted for as long as relays GR4–R4 remain normal and relay MFT remains locked.

As previously described, it has been assumed that the remote switchboard is being operated under team size condition C; that is, all positions of the switchboard are occupied. Under this condition, the calls waiting determining circuit will operate as described in the abovementioned R. N. Breed et al. patent to operate relays GR, WH and R or none of them in accordance with the number of calls waiting per occupied position. If the load indicates a black signal, the conditions do not change. On the other hand, if it does change; for example the load has increased to cause relay GR to operate, then relay GR1 operates to operate relay GR2 and release relay MFT, consequent to which relay CW releases to increase the resistance of the trunk loop and thereby release relays 4A and A1 at the switchboard as an indication of a change of signal, and to make the multifrequency receiver MFR effective in the manner previously described. Relay W is also reoperated and locked over previously described paths. With the operation of relay GR2, relay GR4 is operated. Under this condition the tandem office will transmit frequencies 700 and 900 (codes 0 and 1) which make up the green signal. Remembering that relays GR4 and MFT are both operated, the serial path of the two frequencies may be traced from the source MFS, lead 0, No. 7 contacts of relay FC0, No. 3 contacts of relay LS, No. 5 normally made contacts of relay B′, No. 3 back contacts of relay S0, No. 1 front contacts of relay P1, the primary windings of transformer TR, No. 5 front contacts of relay P1, No. 6 back contacts of relay S0, No. 1 contacts of relay B1, No. 3 back contacts of relay R4, No. 3 back contacts of relay WH4, No. 3 front contacts of relay GR4, No. 9 contacts of relay FC0, lead 1, frequency source MFS.

These frequencies are received by the multifrequency receiver MFR of the remote switchboard, causing said receiver to operate relays SP1, 0 and 1 in the manner described. Thereupon the locking circuit of relay 4B is opened, releasing that relay and a circuit is completed for the green signal relay G over a path which extends from battery through its right winding, No. 3 contacts of relay TBL, No. 4 contacts of relay 1, No. 3 front contacts of relay 0, to ground. On operating, said relay locks over its left winding and No. 1 contacts, No. 4 contacts of relay 7, No. 8 contacts of relay TBL, to ground on the No. 2 contacts of relay ST. Relay G completes an obvious circuit for lamp Green which lights to give the required indication.

If the same manner, if the signal had been white, requiring a lamp frequency signal of 700 and 1100 (code designation 0 and 2), relays 0 and 2 would have been operated, in turn completing the circuit of relay 4W from battery through its left winding, No. 2 contacts of relay TBL, No. 5 contacts of relay 2, No. 3 contacts of relay 0, to ground. On operating, relay 4W locks over its right winding and No. 3 contacts, No. 7 contact of relay 1, No. 4 contacts of relay 7, No. 8 contacts of relay TBL, to ground on the No. 2 contacts of relay ST. Relay 4W completes an obvious circuit for illuminating the lamp White, but it also completes a circuit for relay G over the right winding of said latter relay, No. 3 contacts of relay TBL, to ground on the No. 4 contacts of relay 4W. Relay G operates to illuminate the lamp Green.

If the lamp signal is red, the signal frequencies therefor will be 700 and 1300 cycles (codes 0 and 4), relays 0 and 4 will be operated, and a path is completed for relay R from battery through its right winding, No. 5 contacts of relay 4, to ground on the No. 3 front contacts of relay 0. On operating, relay R locks over its left winding and No. 1 contacts, No. 3 contacts of relay 7, No. 1 contacts of relay 2, No. 9 contacts of relay 1, to aforetraced ground on the contacts of relay ST; completes a circuit for relay 4W over battery through the latter's left winding, No. 2 contacts of relay TBL, to ground on the No. 3 contacts of relay R, and closes the circuit of lamp Red over an obvious path. Relay 4W operates relay G and both light their respective lamps White and Green. That is to say, the number of calls waiting per position occupied may increase from the black signal indication to the green and from the green to the white, at which time both the green and white signals are given to indicate the progressive increase in load. Finally when the load is heaviest for a given team size all three lamps are lighted. This is a useful system of signals, particularly for team sizes A and B. For example, if the switchboard is manned by only five operators or less (team size A) the lighting of the three lamps would indicate that more positions should be utilized; the same thing being true for team size B operation.

The signal persists, of course, for as long as the calls waiting determining circuit continues to give the same indication. If the indication changes, the lamp signal frequencies for the new signal will be transmitted.

*Team size change.*—If the position of the team size key TS is changed after the circuit is in operation (as it might be, for instance, when all three lamps are lighted on team size B as an indication that all positions should be manned to handle the traffic, thus advancing from team size B to team size C with a corresponding change in the setting of the team size key TS), relays TA and TC assume the setting indicated by the change. Relay TA1, TB1 or TC1, whichever was locked, releases, and an operating path is then closed for relay WK over a path controlled by the new setting. For example, if the circuit was operating on team size B, and the key TS is then changed to team size C, relay TC will be operated and relays TA1, TB1 and TC1 will be normal. Consequently, the path for relay WK is closed from battery through its winding, No. 2 back contacts of relay 0, No. 1 back contacts of relay 4B, No. 1 back contacts of relay TA, No. 1 front contacts of relay TC, No. 5 back contacts of relay TC1, No. 3 contacts of relay G (which is operated if a colored lamp signal has been received), No. 1 back contacts of relay TBL, to ground on the No. 5 back contacts of relay SP1. If no colored lamp signal has been received at the time the change in team size is made, then relay 4B will be operated, and the path of relay WK will be as traced to the No. 2 back contacts of relay 0, thence over the No. 2 back contacts of relay 1, No. 1 back contacts of relay TA, No. 1 front contacts of relay TC, No. 5 back contacts of relay TC1, No. 4 contacts of relay 4B, No. 1 contacts of relay TBL, and thence as traced to ground. If the team size key is changed to team size A, relay TA will operate and the path for relay WK will then traverse over the No. 1 front contacts of relay TA, No. 4 back contacts of relay TA1, and thence as traced to ground on the back contacts of relay SP1.

When relay WK operates, it locks over its No. 6 contacts and thence over any of the above operating paths, including the one through the back contacts of relay TC in the event that the team size key is changed to team size B, and, since relays TA1, TB1 and TC1 are all released, releases relay ST which, in turn, releases whichever of the lamp relays G, 4W, R or 4B is operated. Relay WK further releases relay RV which, by reversing the trunk leads T and R, causes the release of relays P in P1 and the originating office. Relay P1 operates relay S0 over a previously described circuit, and releases relay ST1. When the latter relay releases, ground is removed from lead ST, causing the calls waiting determining circuit to restore. It also causes the release of relays LS, MFT, B, B′, A and A′ if operated, and relays C and C′ if operated. Relay S0 has a holding path through the No. 9 back contacts of relay ST1 and the No. 2 front contacts of relay B′ as an insurance that all relays are normal before relay S0 releases. During the releasing time of relay S0, multifrequency signals 1500 and 1700 (codes 4 and 7) are transmitted to the distant switchboard. Since the relay WK is operated to supply battery over lead BAT to the receiver MFR, when the receiver MFR receives these frequencies it operates relay SP1, and after the latter grounds lead L it operates relays 4 and 7, relay WK now further locking over its No. 5 contacts to ground on the No. 2 contacts of relay SP1. Relay 4 locks over the No. 5 contacts of relay 7, No. 7 front contacts of relay 4, No. 8 contacts of WK, to ground on the right front contacts of key CWSIG. Relay 7 locks over the No. 6 contacts of relay 4, and No. 9 front contacts of relay 7 to aforetraced ground. The operation of relays 4 and 7 causes ground to be removed from lead L, but inasmuch as relays 4 and 7 are locked, the removal of the ground has only the effect of causing the receiver to remove ground from the operating paths of said relays 4 and 7.

When relay S0 releases and frequencies 4 and 7 are removed from the trunk leads, the receiver MFR releases relay SP1 which, in turn, releases relay WK. Relay WK, on releasing, also opens at its No. 8 contacts the locking path of relays 4 and 7, which release. The operating path for relay ST is now reestablished by the normal condition of relay WK and ground is connected to lead UL to the receiver when relays 4 and 7 are restored to normal. The circuit now restarts and functions as described to transmit and receive the new team size signals.

When key CWSIG is restored at the switchboard, relay ST releases, in turn releasing the receiver MFR and reversing the trunk to cause the release of relays P and P1 in the manner already described. Relay P1 operates slow release relay S0 over a previously described path, and releases slow release relay ST1. The sending station now sends the disconnect frequencies 4 and 7 as in a team size change, but it has no effect since by the release of key CWSIG the receiving end of the trunk is all normal and unresponsive.

Mention has been made of the fact that the lamp Red is always illuminated in conjunction with lamps Green and White to indicate the load condition for the team size signal. The illumination of the lamp Red alone, however, is used as an indication of a trouble condition. The following trouble conditions will cause relay TBL to operate and lock, operating relay R over an obvious circuit, the latter then completing the circuit of the lamp Red.

(*a*) If the switchboard receives a team size signal when it should be receiving a lamp signal. In such a case, relay 4B or G will be operated from a previously received lamp signal, and the team size signal will cause the operation of relay 1 incident to the receiver MFR receiving the common team size frequency 900 and some other code frequency (except 0). Under these circumstances a circuit is completed for relay TBL from battery through its right winding, No. 7 contacts of relay ST, No. 9 contacts of relay WK, No. 1 back contacts of relay 0, No. 3 contacts of relay 1, to ground either on the No. 4 contacts of relay G or the No. 2 contacts of relay 4B. Relay TBL operates and completes the circuit of relay R, which functions as before to illuminate lamp Red.

(*b*) If the circuit receives a lamp signal without having been satisfied with the proper team size signal. In this case, neither relay TA1, TB1 nor TC1 will be operated, but relay 0 will be in response to the common lamp signal frequency 700. Therefore the circuit of relay TBL will be completed as before to the No. 9 contacts of relay WK, then through the No. 1 front contacts of relay 0, serially through the No. 6 contacts of relays TA1 and TB1, to ground on the No. 1 contacts of relay TC1. Relay TBL operates relay R which lights the lamp Red.

(*c*) If more than two frequencies are received by the receiver MFR, said receiver will ground lead R0, which completes the circuit path of relay TBL over the No. 9 back contacts of relay WK and the No. 7 contacts of relay ST.

If a legitimate lamp signal is received after the trouble condition indication has been locked in, the receiver MFR will operate relays SP1 and 0 and one of the relays 1, 2, 4 or 7 which, in turn, will cause the operation of relay WK over a path from battery through its winding, No. 2 front contacts of relay 0, No. 6 front contacts of relay 1 (assumed to be operated for the green signal), No. 7 back contacts of relay 2, No. 1 back contacts of relay 4, No. 8 back contacts of relay 7, No. 6 front contacts of relay TC1 (assumed to be operated for team size C), serially through the No. 5 back contacts of relays TB1 and TA1, to ground on the No. 5 front contacts of relay SP1. Relay WK operates, locks to ground on the No. 2 contacts of relay SP1, and releases relay TBL. The latter relay then removes the previously described holding path for relay RV, which releases. The release of relay TBL permits relay R to release if the incoming signal is not red. It also closes the previously described path for operating relay G for the lamp signal being set up.

When relay RV releases and the circuit path is reversed over the trunk conductors, relays P and P1 release at the sending office to remove the multifrequency signal, causing the release of the receiver MFR at the remote switchboard, the latter in turn releasing relay SP1 which, in turn, releases relay WK. The operation of the circuit now continues as previously described.

(*d*) Mention has already been made of the fact that if the sending office fails to receive an acknowledgment of a team size signal it transmits a black signal, resulting in the operation of relays 0 and 7. With relay WK normal, a circuit is completed to relay TBL extending from battery through its right winding, No. 7 contacts of relay ST, No. 9 contacts of relay WK, No. 1 front contacts of relay 0, No. 6 contacts of relay TA1, No. 6 contacts of relay TB1, to ground on the No. 1 contacts of relay TC1.

Relay TBL operates, locks over its left winding and No. 5 contacts, No. 8 contacts of relay ST, to ground on the No. 2 contacts of relay WK, and closes an obvious circuit for relay R which completes the circuit of lamp Red. When this occurs, the circuit should be restored and restarted by releasing and reoperating the key CWSIG and the team size key TS.

(*e*) Again, the remote switchboard may fail to acknowledge a lamp signal, for instance the green signal. At this time relays LS and W are operated at the sending office, as will be recalled. Relays B and B′ are normal, having released during the open period of the interrupter INT. Relay B′ unlocks relay CW which releases.

When the interrupter INT recloses, relay B reoperates over a previously traced path, and completes a path to operate relay MFT, which path may be traced from battery through the winding of said latter relay, No. 5 contacts of relay LS, No. 2 back contacts of relay K, No. 5 contacts of relay B, to ground on the No. 2 back contacts of relay B′. Relay MFT operates and then locks over its No. 4 contacts, No. 4 contacts of relay ST1, right contacts of reset key SIG ALM RESET, No. 4 back contacts of relays R4 and WH4, No. 4 front contacts of relay GR4, No. 4 front contacts of relay GR2, No. 4 back contacts of relays WH2 and R2, to ground. It also provides a series holding circuit for relays B and B′ when the latter relay has operated on the opening of interrupter INT, said holding circuit extending over the No. 7 contacts of relay K, No. 5 contacts of relay MFT, to ground on the No. 8 contacts of relay ST. The operation of relay B′ removes the multifrequency signal from the trunk. On the next operation of interrupter INT, a circuit is completed for relay FC0 from battery through its lower winding, No. 4 contacts of relay CW, No. 1 front contacts of relay LS, No. 10 front contacts of relay B′, No. 2 contacts of relay W, No. 3 contacts of relay ST1, No. 4 contacts of relay P1, to ground on the interrupter INT. On operating, relay FC0 extends the operating ground over its No. 5 contacts to the lower winding of relay SA, which operates and locks over its upper winding and left contacts of reset key SIG ALM to ground. The latter relay then lights lamp SIG ALM. Relay FC0 locks over its upper winding and No. 3 contacts, No. 1 front contacts of relay SA, to ground on the No. 7 contacts of relay ST1, and holds relay MFT by ground on its No. 2 contacts. Relay FC0 cuts off all multifrequency signals used for team size and lamp signaling.

Reset key SIG ALM is operated to restore the alarm. When the key is operated, relay SA releases, opening the circuit of lamp SIG ALM, releases relay FC0, which again closes the multifrequency signal leads and releases relay MFT, in turn releasing relays B and B′. When relay MFT releases, relays GR4, WH4 and R4 take their proper setting depending upon the condition of relays GR2, WH2 and R2. With slow release B′ normal, the lamp signal path is again closed for transmission of the multifrequency lamp signal.

Lamp signaling can also be resumed if key CWSIG at the remote switchboard is released for a sufficient interval to cause disconnection. The circuit will restart when key CWSIG is operated, whereupon operations will take place as previously described.

(*f*) Certain precautions are taken at the sending office against what may be termed an overload condition; that is, the condition when the remote switchboard is being operated by a single operator, and this operator disconnects her set from the position with one or more calls waiting. For this condition the circuit of meter M is subject to a heavy overload current. To protect the meter and otherwise call attention to the condition of service, relays OL, OL1 and OL2 are provided. The first two relays are inserted in series with meter M, and both operate on an overload current, relay OL short-circuiting the meter and relay OL1 operating relay OL2 over a circuit completed through the winding of said latter relay, contacts of relay OL1, contacts of reset key Reset, to ground on lead ST, previously traced thereto. Relay OL2 operated, locks over its No. 2 contacts to ground on lead ST, places an additional short circuit about the meter M over its No. 3 contacts, completes the circuit of alarm lamp ALM by ground on its No. 1 contacts, completes the circuits of relays GR4, WH4 nad R4 from ground on lead ST, and Nos. 4, 5 and 6 contacts, and then over the following paths for each of the several relays: for relay GR4 over the No. 4 contacts of relay OL2, No. 3 back contacts of relay MFT, to the winding of relay GR4; for relay WH4 over the No. 5 contacts of relay OL2, No. 7 back contacts of relay MFT, winding of relay WH4; for relay R4 over the No. 6 contacts of relay OL2, No. 6 back contacts of relay MFT, winding of relay R4. These relays operate, lock to operating ground, and cause the circuit to operate as described to transmit to the remote switchboard the proper multifrequencies to light the white, green and red lamps thereat. When relay K operates as before described as an acknowledgment that the frequencies have been received at the remote switchboard, a circuit is closed for relay FC0 from ground on the No. 1 contacts of relay OL2, No. 1 front contacts of relay R4, No. 5 contacts of relay K, upper winding of relay FC0 to battery. Relay FC0 operates, locks over its No. 4 contacts to operating ground, and prevents further transmission of lamp signals.

While I have illustrated my invention in its application for use in a telephone system, it should be understood that it is not limited to such application or to the specific arrangements herein disclosed, it being apparent to one skilled in the art that various applications, modifications and arrangements other than those disclosed herein are within the scope of the invention.

The terms and expressions which I have employed in reference to the invention are used as terms of description and not of limitation, and I have no intention in the use of such terms and expressions of excluding thereby equivalents of the features shown and described or portions thereof but, on the contrary, intend to include therein any and all equivalents and modifications which may be employed without departing from the spirit of the invention.

What is claimed is:

1. In a signaling system, a sending station, a receiving station, a transmission channel between said two stations, means at said sending station for producing a plurality of pairs of electrical oscillations of different frequencies, means at said sending station for transmitting said different pairs of frequency oscillation to said receiving station over said transmission channel, a plurality of signal indicators at said receiving station, means at said receiving station settable to be responsive to a selected pair of said frequencies, means responsive to the operation of said frequency responsive means for one of said pairs of frequencies for operating said transmitting means at said sending station for transmitting another and predetermined pair of frequencies to said sending station, and means in said receiving station associated with said signal indicators for rendering said signal indicators selectively operative solely in response to said other and predetermined pair of frequencies.

2. In a signaling system, a sending station having means for transmitting a plurality of signals of one class and a plurality of signals of another class, a signal selective device, a receiving station having means settable to receive a selected one of said signals in said one class and means for receiving each of said signals in said other class, a transmission channel between said two stations, means in said receiving station responsive to the reception of the signal in said one class for which said settable means in said receiving station is set for operating said signal selective device in said sending station to select for transmission to said receiving station a signal in said other class in accordance with the signal in said one class to which said receiving station has responded, means in said receiving station responsive to the reception of the signal in said one class for which said settable means is set, to prepare said receiving station for receiving said signal in said other class, an alarm, and means effective to operate said alarm if an additional signal in said first class is received after said receiving station is prepared to receive a signal in said second class.

References Cited in the file of this patent

UNITED STATES PATENTS

| | | |
|---|---|---|
| 1,600,358 | Puckette | Sept. 21, 1926 |
| 2,202,392 | May | May 28, 1940 |
| 2,785,388 | McWhirter | Mar. 12, 1957 |

FOREIGN PATENTS

| | | |
|---|---|---|
| 469,348 | Great Britain | July 23, 1937 |